(12) United States Patent
Kawasaki et al.

(10) Patent No.: US 9,589,213 B2
(45) Date of Patent: Mar. 7, 2017

(54) APPARATUS FOR RECOGNIZING TURNOFF FROM VEHICLE ROADWAY

(71) Applicant: DENSO CORPORATION, Kariya, Aichi-pref. (JP)

(72) Inventors: Naoki Kawasaki, Kariya (JP); Syunya Kumano, Gothenburg (SE); Shunsuke Suzuki, Aichi-ken (JP); Tetsuya Takafuji, Anjo (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/621,794

(22) Filed: Feb. 13, 2015

(65) Prior Publication Data

US 2015/0235095 A1   Aug. 20, 2015

(30) Foreign Application Priority Data

Feb. 14, 2014   (JP) .................. 2014-026593

(51) Int. Cl.
  *G08B 21/00*   (2006.01)
  *G06K 9/62*    (2006.01)
  *G06K 9/00*    (2006.01)

(52) U.S. Cl.
  CPC ....... *G06K 9/6292* (2013.01); *G06K 9/00798* (2013.01)

(58) Field of Classification Search
  CPC ........... G06K 9/00798; G06K 9/00805; G06K 9/6202; G06K 9/6292
  USPC ........................................................ 340/435
  See application file for complete search history.

(56) References Cited

U.S. PATENT DOCUMENTS

| | | | |
|---|---|---|---|
| 6,577,334 B1 | 6/2003 | Kawai et al. | |
| 2005/0270374 A1 | 12/2005 | Nishida et al. | |
| 2006/0239509 A1 | 10/2006 | Saito | |
| 2009/0157286 A1* | 6/2009 | Saito | B60W 30/16 701/117 |
| 2012/0148094 A1* | 6/2012 | Huang | G06K 9/00785 382/103 |

FOREIGN PATENT DOCUMENTS

| | | |
|---|---|---|
| JP | 2000-105898 | 4/2000 |
| JP | 2000-207692 | 7/2000 |

(Continued)

*Primary Examiner* — Mark Rushing
(74) *Attorney, Agent, or Firm* — Harness, Dickey & Pierce, P.L.C.

(57) ABSTRACT

An apparatus for determining the presence or absence of a turnoff from a roadway. In the apparatus, a white-line candidate extractor applies image processing to an image of surroundings of a subject vehicle acquired by a vehicle-mounted camera to extract white-line candidates in the roadway. A white-line likelihood calculator calculates, for each of the white-line candidates extracted by the white-line candidate extractor, a likelihood of the white-line candidate. A white-line likelihood calculator calculates, for each of the white-line candidates extracted by the white-line candidate extractor, a likelihood of the white-line candidate. A turnoff determiner calculates a likelihood for one of a plurality of features of the white line selected by the white-line selector, and determines the presence or absence of a turnoff from the roadway based on the likelihood calculated by the turnoff determiner.

6 Claims, 3 Drawing Sheets

(56) References Cited

FOREIGN PATENT DOCUMENTS

| | | |
|---|---|---|
| JP | 2005-346383 | 12/2005 |
| JP | 2006-172225 | 6/2006 |
| JP | 2006-331389 | 12/2006 |
| JP | 2007-164636 | 6/2007 |
| JP | 2011-192164 | 9/2011 |
| JP | 2013-097738 | 5/2013 |
| JP | 2014-021051 | 2/2014 |

* cited by examiner

FIG.5A

| PARALLELISM VARIATION | 0 | 1 |
|---|---|---|
| LIKELIHOOD | 0.5 | 0.1 |

FIG.5B

| CURVATURE VARIATION | 0 | 1 |
|---|---|---|
| LIKELIHOOD | 0.5 | 0.1 |

FIG.5C

| COMPOUND-LINE LIKENESS | 0 | 1 |
|---|---|---|
| LIKELIHOOD | 0.5 | 0.1 |

FIG.5D

| BROKEN-LINE LIKENESS | 0 | 1 |
|---|---|---|
| LIKELIHOOD | 0.5 | 0.1 |

FIG.5E

| TIGHTER-CURVE LIKENESS | 0 | 1 |
|---|---|---|
| LIKELIHOOD | 0.5 | 0.1 |

APPARATUS FOR RECOGNIZING TURNOFF FROM VEHICLE ROADWAY

CROSS-REFERENCE TO RELATED APPLICATION

This application is based on and claims the benefit of priority from earlier Japanese Patent Applications No. 2014-26593 filed Feb. 14, 2014, the descriptions of which are incorporated herein by reference.

BACKGROUND

Technical Field

The present invention relates to techniques for accurately recognizing a turnoff from a roadway.

Related Art

A technique, as disclosed in Japanese Patent Application Laid-Open Publication No. 2006-331389, focuses on parallelism with an estimated trajectory of a subject vehicle, and detects a lane of a lower parallelism as a turn-off lane. Another technique, as disclosed in Japanese Patent Application Laid-Open Publication No. 2000-105898, determines a turnoff based on changes in lane width.

However, the technique as described in Japanese Patent Application Laid-Open Publication No. 2006-331389 may mistakenly detect a non-turnoff as a turnoff due to a large variation in the parallelism or curvature when it is difficult to estimate a shape of a road with a compound line therein having a plurality of white lines. Thus, a problem with this technique has been that a shape of a vehicle path can not be estimated accurately.

Another technique as disclosed in Japanese Patent Application Laid-Open Publication No. 2000-105898 is configured to determine the presence or absence of a turnoff based on merely one feature. Thus, this technique may also mistakenly detect a non-turnoff as a turnoff. A problem with this technique has been that a shape of a vehicle path can not be estimated accurately.

In consideration of the foregoing, exemplary embodiments of the present invention are directed to providing techniques for accurately recognizing a turnoff from a roadway.

SUMMARY

In accordance with an exemplary embodiment of the present invention, there is provided an apparatus for determining the presence or absence of a turnoff from a roadway. The apparatus includes: a white-line candidate extractor configured to apply image processing to an image of surroundings of a subject vehicle (that is a vehicle mounting the apparatus) acquired by a vehicle-mounted camera to extract white-line candidates in the roadway; a white-line likelihood calculator configured to calculate, for each of the white-line candidates extracted by the white-line candidate extractor, a likelihood of the white-line candidate; a white-line selector configured to, based on the likelihoods of the white-line candidates calculated by the white-line likelihood calculator, select a white line; and a turnoff determiner configured to calculate a likelihood for one of a plurality of features of the white line selected by the white-line selector, the plurality of features including (1) the lane line is not a compound line, (2) the lane line is a solid line, (3) the lane line is not a tighter curve, (4) a variation in the parallelism between left and right lane lines is greater than a predetermined value, and (5) a variation in the curvature of the lane line is greater than a predetermined value, and the turnoff determiner being configured to determine the presence or absence of a turnoff from the roadway based on the likelihood calculated by the turnoff determiner.

With this configuration, the turnoff from the roadway can be accurately recognized.

BRIEF DESCRIPTION OF THE DRAWINGS

FIG. 5A is a schematic of calculating a parallelism-variation likelihood;

FIG. 5B is a schematic of calculating a curvature-variation likelihood;

FIG. 5C is a schematic of calculating a compound-line likelihood;

FIG. 5D is a schematic of calculating a solid- or broken-line likelihood; and

FIG. 5E is a schematic of calculating a tighter curve likelihood.

DESCRIPTION OF SPECIFIC EMBODIMENTS

Figure 1:
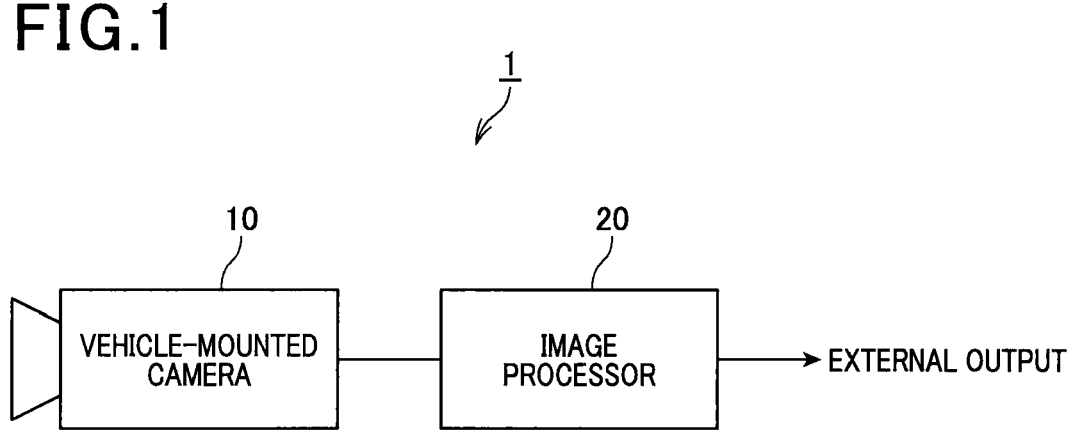
FIG. 1 is a block diagram of a turnoff recognition apparatus in accordance with one embodiment of the present invention.

The description herein makes reference to the accompanying drawings wherein like reference numerals refer to like parts throughout the several views.

(1. Turnoff Recognition Apparatus)

A turnoff recognition apparatus 1, as shown in FIG. 1, includes a vehicle-mounted camera 10 configured to capture images of surroundings of a subject vehicle, and an image processor 20 configured to process the images captured by the vehicle-mounted camera 10.

(1.1. Vehicle-Mounted Camera)

Figure 2:
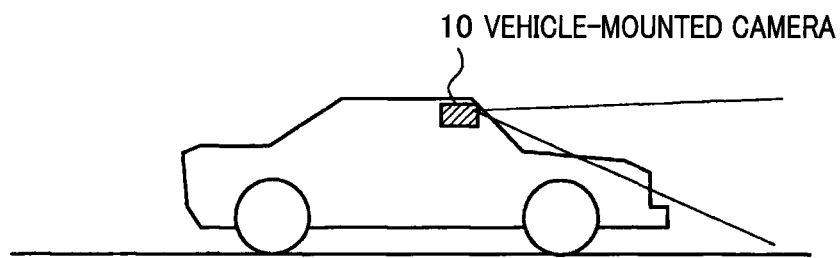
FIG. 2 is a schematic of positioning a vehicle-mounted camera within a vehicle.

The vehicle-mounted camera 10 includes a charge-coupled device (CCD) camera. As shown in FIG. 2, the vehicle-mounted camera 10 is disposed in the center front of the vehicle to sequentially capture images ahead of the subject vehicle.

(1.2. Image Processor)

Figure 3:
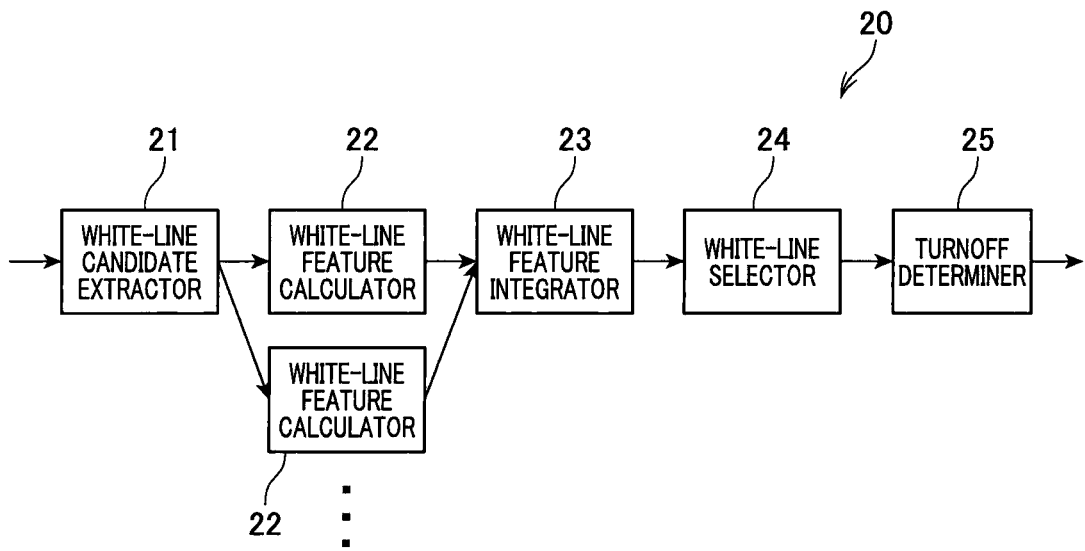
FIG. 3 is a functional block diagram of an image processor of the turnoff recognition apparatus.

The image processor (IP) 20 may be a well-known microcomputer including Central Processing Unit (CPU), Read Only Memory (ROM), Random Access Memory (RAM), Electrically Erasable Programmable Read-Only Memory (EEPROM), Digital Signal Processors (DSPs) and others. As shown in FIG. 3, the image processor 20 includes various DSPs which respectively function as a white-line candidate extractor 21, a set of white-line feature calculators 22, a white-line feature integrator 23, a white-line selector 24, and a turnoff determiner 25. Alternatively, these functional blocks 21-25 may be implemented by the CPU executing computer programs stored in the ROM or the like.

The white-line candidate extractor 21 is configured to process an image acquired by the vehicle-mounted camera 10 to extract a likely white line (hereinafter also referred to as a white-line candidate) in a roadway. More specifically, the white-line candidate in the roadway is extracted from the image acquired by the vehicle-mounted camera 10 via well-known image processing, such as pattern matching, votes in the Hough-transform for straight-line extraction (a solid- or broken-line determination). It should be noted that a plurality of white-line candidates may be extracted in one frame of image.

The set of white-line feature calculators 22 are configured to calculate a plurality of degrees of belief in likeness for each of the white line candidates extracted by the white-line candidate extractor 21. Each of the plurality of degrees of belief in likeness takes a value (likelihood) within a range of 0.01-1. The plurality of degrees of belief in likeness are respectively associated with the following processes of (1) determining a line-type (compound-line) pattern, (2) determining solidness (votes), (3) determining straightness, (4) determining contrast intensity, (5) determining contrast conspicuity, (6) determining white-line plainness, (7) determining a distance from a crosswalk, (8) determining luminance relative to the roadway surface, and (9) determining a distance from an object.

The white-line feature integrator 23 is configured to calculate and output a product of the degrees of belief in likeness determined in the respective processes (1)-(9) in the Bayesian inference scheme as a white-line likelihood (i.e., a likelihood indicative of how the white line candidate is likely). The white-line feature calculators 22 and the white-line feature integrator 23 form a likelihood calculator.

The white-line selector 24 is configured to select, as a control-target white line in the roadway, a white-line candidate having a maximum likelihood among the likelihoods outputted from the white-line feature integrator 23 and having the following features: (i) the white-line is an innermost solid line relative to the subject vehicle, (ii) the white line is not an external line during the turnoff determination process, and (iii) a pair of right and left white lines are likely lane lines, and others. The white-line feature integrator 23 outputs, for each white-line candidate, a likelihood that is an integration of degrees of belief in likeness for the white-line candidate. The white-line selector 24 selects a white-line candidate having a maximum likelihood and having the above features as a control-target white line in the roadway.

The turnoff determiner 25 is a DSP configured to perform a turnoff recognition process (described later) to calculate a degree of belief in the presence of a turnoff (or a degree of belief that a turnoff exists) from features (described later) of the white line selected by the white-line selector 24, and based on the degree of belief in the presence of a turnoff, determine the presence or absence of the turnoff. The turnoff determiner 25 uses the following features: (1) the lane line is not a compound line; (2) the lane line is a solid line, (3) the lane line is not a tighter curve, (4) a variation in the parallelism between left and right lane lines is greater than a predetermined value, and (5) a variation in the curvature of the lane line is greater than a predetermined value. The turnoff determiner 25 is configured to calculate a likelihood for one of the features (1)-(5) or an integration of likelihoods (integrated likelihood) for two or more of the features (1)-(5), and based on the calculated likelihood, determine the presence or absence of a turnoff.

(2. Turnoff Recognition Process)

Figure 4:
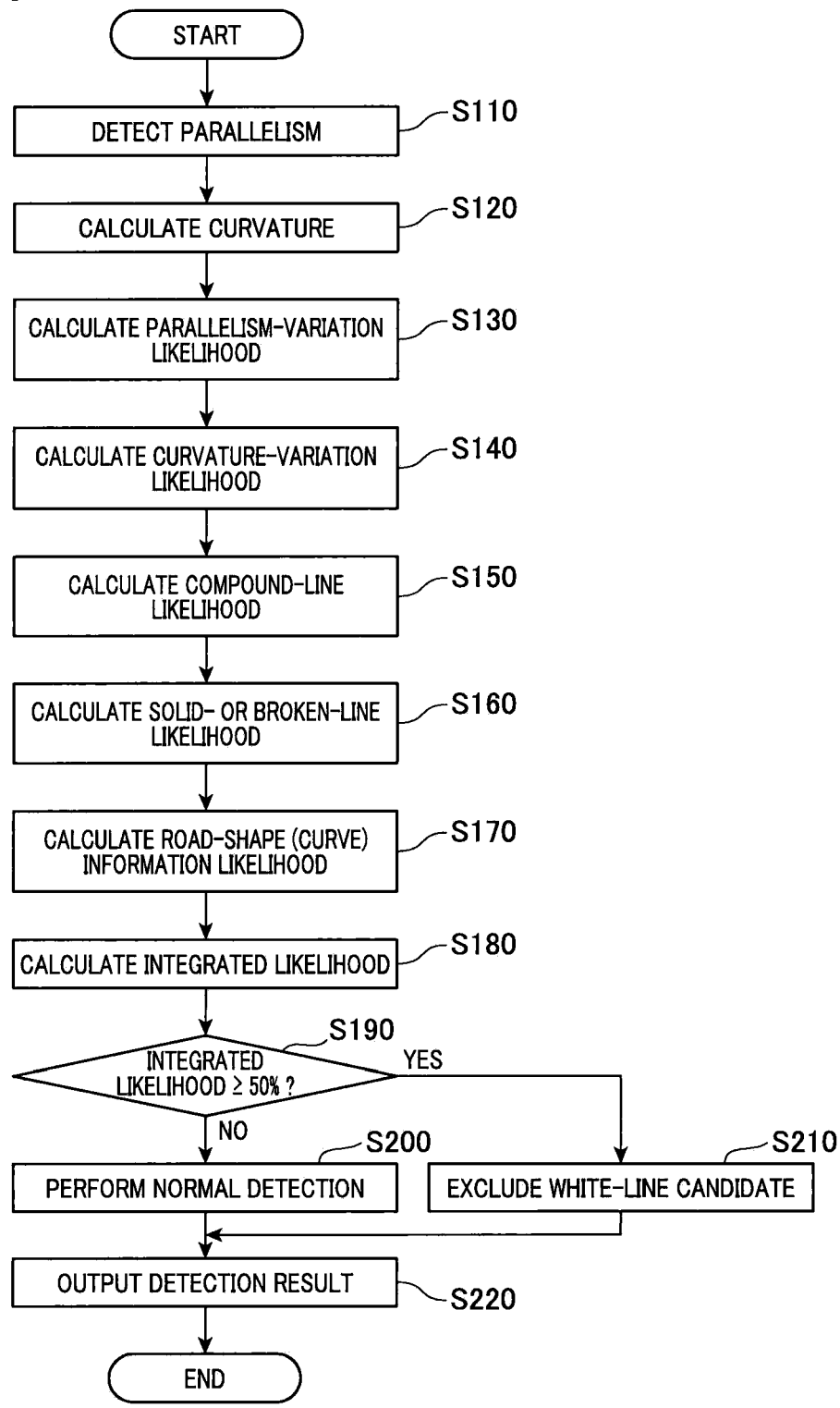
FIG. 4 is a flowchart of a turnoff recognition process.

The turnoff recognition process to be performed in the image processor 20 will now be explained with reference to the flowchart of FIG. 4.

The turnoff recognition process is performed repeatedly every predetermined time interval during travelling of the subject vehicle.

First, in step S110, the parallelism is calculated. More specifically, the turnoff determiner 25 determines the parallelism between left and right lane lines for the white line selected by the white-line selector 24. Thereafter, the process proceeds to step S120.

In step S120, the turnoff determiner 25 calculates a curvature of the white line selected by the white-line selector 24.

Thereafter, the process proceeds to step S130, where the turnoff determiner 25 calculates a variation in the parallelism between the pair of left and right lane lines calculated in step S110 and calculates a likelihood of the calculated parallelism variation. More specifically, the likelihood of the parallelism variation is calculated with reference to a table of FIG. 5A. The likelihood for a small variation in the parallelism between the pair of left and right lane lines is 0.5. The likelihood for a large variation in the parallelism between the pair of left and right lane lines is 0.1. The likelihood of 0.5 prevents the turnoff determiner 25 from determining that a turnoff exists for a small variation in the parallelism between the pair of left and right lane lines. The likelihood of 0.1 reverses the prevention only when a plurality of other intellectual properties (IPs) confidently determine that a turnoff exists. Thereafter, the process proceeds to step S140.

In step S140, the turnoff determiner 25 calculates a variation in the curvature calculated in step S120 for the white line and calculates a likelihood for the calculated curvature variation. More specifically, the likelihood for the calculated curvature variation of the white line is calculated with reference to a table of FIG. 5B. The likelihood for a curvature variation less than a predetermined value is 0.5. The likelihood for a curvature variation greater than the predetermined value is 0.1. The likelihood of 0.5 prevents the turnoff determiner 25 from determining that a turnoff exists for a smaller curvature variation. The likelihood of 0.1 reverses the prevention only when a plurality of other IPs confidently determine that a turnoff exists. Thereafter, the process proceeds to step S150.

In step S150, the turnoff determiner 25 calculates, for the white line selected by the white-line selector 24, a likelihood for the compound-line likeness. More specifically, the likelihood for the compound-line likeness is calculated with reference to a table of FIG. 5C. The likelihood for the compound-line likeness less than a predetermined value is 0.5. The likelihood for the compound-line likeness greater than the predetermined value is 0.1. The likelihood of 0.5 prevents the turnoff determiner 25 from determining that a turnoff exists for a smaller compound-line likeness. The likelihood of 0.1 reverses the prevention only when a plurality of other IPs confidently determine that a turnoff exists. Thereafter, the process proceeds to step S160.

In step S160, the turnoff determiner 25 calculates, for the white line selected by the white-line selector 24, a likelihood for the solid- or broken-line likeness. More specifically, the likelihood for the broken-line likeness is calculated with reference to a table of FIG. 5D. For example, the likelihood for the broken-line likeness less than a predetermined value is 0.5. The likelihood for the broken-line likeness greater than the predetermined value is 0.1. The likelihood of 0.5 prevents the turnoff determiner 25 from determining that a turnoff exists for a smaller broken-line likeness. The likelihood of 0.1 reverses the prevention only when a plurality of other IPs confidently determine that a turnoff exists. Thereafter, the process proceeds to step S170.

In step S170, a likelihood for road-shape (e.g., a curve) information is calculated. The turnoff determiner 25 calculates, for the white line selected by the white-line selector 24, a likelihood for a tighter-curve likeness. More specifically, the likelihood for the tighter-curve likeness is calculated with reference to a table of FIG. 5E. The likelihood for the tighter-curve likeness less than a predetermined value is 0.5. The likelihood for the tighter-curve likeness greater than the predetermined value is 0.1. The likelihood of 0.5 prevents the turnoff determiner 25 from determining that a turnoff exists for a smaller tighter-curve likeness. The likelihood of 0.1 reverses the prevention only when a plurality of other IPs confidently determine that a turnoff exists. Thereafter, the process proceeds to step S180.

In step S180, the turnoff determiner 25 calculates an integrated likelihood (hereinafter referred to as a turnoff integrated likelihood) that is a product of the parallelism-variation likelihood calculated in step S130, the curvature-variation likelihood calculated in step S140, the compound-line likelihood calculated in step S150, the solid- or broken-line likelihood calculated in step S160, and the tighter-curve likelihood calculated in step S170. Thereafter, the process proceeds to step S190. A technique for calculating such an integrated likelihood is described in U.S. Pat. No. 8,744,194, which is also owned by the present assignees and hereby incorporated by reference in its entirety.

In step S190, it is determined whether or not the turnoff integrated likelihood (in percent figures) is equal to or greater than a predetermined value. More specifically, the turnoff determiner 25 determines whether or not the turnoff integrated likelihood calculated in step S180 is equal to or greater than 50% as the predetermined value. If it is determined in step S190 that the turnoff integrated likelihood is equal to or greater than 50%, then the process proceeds to step S210. If it is determined in step S190 that the turnoff integrated likelihood is less than 50%, then the process proceeds to step S200.

In step S200, normal detection is performed. More specifically, upon determination in step S190 that the turnoff integrated likelihood is less than 50%, the turnoff determiner 25 detects the subject white-line candidate (i.e., the white-line candidate being processed) as a white line. Thereafter, the process proceeds to step S220.

In step S210, the turnoff determiner 25 excludes the white-line candidate. More specifically, upon determination in step S190 that the turnoff integrated likelihood is equal to or greater than 50%, the turnoff determiner 25 excludes the subject white-line candidate. The turnoff determiner 25 determines that a turnoff exists. Thereafter, the process proceeds to step S220.

In step S220, the turnoff determiner 25 outputs a detection result. More specifically, if the process proceeds from step S200 to step S220, then the turnoff determiner 25 outputs a detection result that the subject white-line candidate is a white line. If the process transitions from step S210 to step S220, then the turnoff determiner 25 excludes the subject white-line candidate and outputs a detection result that a turnoff exists. Thereafter, the process ends. The turnoff determiner 25 includes a section (as a determination output) for outputting the detection result.

(3. Advantages)

In the turnoff recognition apparatus 1 of the present embodiment, the turnoff determiner 25 uses the following features of the white line selected by the white-line selector 24: (1) the lane line is not a compound line; (2) the lane line is a solid line, (3) the lane line is not a tighter curve, (4) a variation in the parallelism between left and right lane lines is greater than a predetermined value, and (5) a variation in the curvature of the lane line is greater than a predetermined value, to calculate a likelihood for one of the features (1)-(5) or an integration of likelihoods (integrated likelihood) for two or more of the features (1)-(5), and based on the calculated likelihood, determines the presence or absence of a turnoff.

While the invention has been described in connection with what is presently considered to be the most practical and preferred embodiment, it is to be understood that the invention is not to be limited to the disclosed embodiment but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for determining the presence or absence of a turnoff from a roadway, the apparatus comprising:
    a white-line candidate extractor configured to apply image processing to an image of surroundings of a subject vehicle acquired by a vehicle-mounted camera to extract white-line candidates in the roadway;
    a white-line likelihood calculator configured to calculate, for each of the white-line candidates extracted by the white-line candidate extractor, a likelihood of the white-line candidate, the likelihood of the white-line candidate being a likelihood that the white-line candidate is an actual white line appearing in the image;
    a white-line selector configured to, based on the likelihoods of the white-line candidates calculated by the white-line likelihood calculator, select a white line; and
    a turnoff determiner configured to calculate a likelihood for one of a plurality of features of the white line selected by the white-line selector, the plurality of features including (1) the lane line is not a compound line, (2) the lane line is a solid line, (3) the lane line is not a tighter curve, (4) a variation in the parallelism between left and right lane lines is greater than a predetermined value, and (5) a variation in the curvature of the lane line is greater than a predetermined value, and the turnoff determiner being configured to determine the presence or absence of a turnoff from the roadway based on the likelihood calculated by the turnoff determiner.

2. The apparatus of claim 1, wherein the turnoff determiner is configured to, when the likelihood calculated by the turnoff determiner is equal to or greater than a predetermined value, determine that a turnoff exists in the roadway, and when the likelihood calculated by the turnoff determiner is less than the predetermined value, determine that no turnoff exists in the roadway.

3. The apparatus of claim 1, wherein the turnoff determiner further comprises a determination output configured to output the determination result of the determiner.

4. An apparatus for determining the presence or absence of a turnoff from a roadway, the apparatus comprising:
    a white-line candidate extractor configured to apply image processing to an image of surroundings of a subject vehicle acquired by a vehicle-mounted camera to extract white-line candidates in the roadway;
    a white-line likelihood calculator configured to calculate, for each of the white-line candidates extracted by the white-line candidate extractor, a likelihood of the white-line candidate, the likelihood of the white-line candidate being a likelihood that the white-line candidate is an actual white line appearing in the image;
    a white-line selector configured to, based on the likelihoods of the white-line candidates calculated by the white-line likelihood calculator, select a white line; and a turnoff determiner configured to calculate an integration of likelihoods for two or more of a plurality of features of the white line selected by the white-line selector, the plurality of features including (1) the lane line is not a compound line, (2) the lane line is a solid line, (3) the lane line is not a tighter curve, (4) a variation in the parallelism between left and right lane lines is greater than a predetermined value, and (5) a variation in the curvature of the lane line is greater than a predetermined value, and the turnoff determiner being configured to determine the presence or absence of a turnoff from the roadway based on the integration of likelihoods calculated by the turnoff determiner.

5. The apparatus of claim 4, wherein the turnoff determiner is configured to, when the integration of likelihoods calculated by the turnoff determiner is equal to or greater than a predetermined value, determine that a turnoff exists in the roadway, and when the integration of likelihoods calculated by the turnoff determiner is less than the predetermined value, determine that no turnoff exists in the roadway.

6. The apparatus of claim 4, wherein an integration of likelihoods for two or more of the plurality of features is a product of likelihoods for two or more of the plurality of features.

\* \* \* \* \*